(12) United States Patent
De France et al.

(10) Patent No.: US 10,378,576 B2
(45) Date of Patent: Aug. 13, 2019

(54) TORQUE INDICATING THREADED MECHANICAL FASTENING SYSTEMS AND METHODS

(71) Applicant: Hubbell Incorporated, Shelton, CT (US)

(72) Inventors: Robert Victor De France, Poughkeepsie, NY (US); Daniel David Dobrinski, Hillsboro, NH (US); Jefferson Robert Hall, Concord, NH (US)

(73) Assignee: Hubbell Incorporated, Shelton, CT (US)

( * ) Notice: Subject to any disclaimer, the term of this patent is extended or adjusted under 35 U.S.C. 154(b) by 545 days.

(21) Appl. No.: 14/752,591

(22) Filed: Jun. 26, 2015

(65) Prior Publication Data

US 2015/0377275 A1  Dec. 31, 2015

Related U.S. Application Data

(60) Provisional application No. 62/018,229, filed on Jun. 27, 2014.

(51) Int. Cl.
*F16B 43/02* (2006.01)
*F16B 31/02* (2006.01)
(Continued)

(52) U.S. Cl.
CPC ............ *F16B 31/028* (2013.01); *F16G 11/00* (2013.01); *F16B 2/10* (2013.01)

(58) Field of Classification Search
CPC ............. F16G 11/00; F16B 2/10; F16B 31/04
(Continued)

(56) References Cited

U.S. PATENT DOCUMENTS 1,419,564 A * 6/1922 Hosking ................. F16B 39/24
411/165
1,774,695 A * 9/1930 Baynes ................. F16B 31/028
116/DIG. 34
(Continued)

FOREIGN PATENT DOCUMENTS

GB          2217421 A      4/1998

OTHER PUBLICATIONS

Transmittal of International Preliminary Report on Patentability dated Dec. 27, 2016 from corresponding International PCT Patent Application No. PCT/US2015/038137, 7 pages.
(Continued)

*Primary Examiner* — Gary W Estremsky
(74) *Attorney, Agent, or Firm* — Ohlandt, Greeley, Ruggiero & Perle, L.L.P.

(57) ABSTRACT

Threaded mechanical fastening systems and methods are provided that allow the simple deflection of a washer to indicate that a desired minimum torque has been reached or that a desired maximum torque has been exceeded. The method includes providing a threaded connection having a washer, installing the threaded connection so that the washer is supported as a simple beam over a gap, and using an amount of deflection of the washer as a result of torque applied by the threaded connection as an indicator. The torque indicating threaded mechanical fastening system includes a threaded connection and a washer supported as a simple beam over a gap so that the threaded connection, when tightened to a predetermined torque, deflects, in bending, the washer into the gap.

18 Claims, 16 Drawing Sheets

(51) Int. Cl.
   *F16G 11/00* (2006.01)
   *F16B 2/10* (2006.01)
(58) Field of Classification Search
   USPC .... 411/544, 1, 2, 5, 6, 8, 9, 11, 10; 439/479
   See application file for complete search history.

(56) References Cited

U.S. PATENT DOCUMENTS

| | | | | |
|---|---|---|---|---|
| 2,277,443 A * | 3/1942 | Livingston | ............ | H01H 50/56 200/1 A |
| 3,133,468 A * | 5/1964 | Cumming | ............ | E21D 21/02 411/11 |
| 3,150,557 A * | 9/1964 | Brown | ............ | E21D 21/0086 411/9 |
| 3,221,793 A * | 12/1965 | Gutshall | ............ | F16B 39/24 411/134 |
| 3,321,221 A * | 5/1967 | Harris | ............ | F16B 5/06 403/241 |
| 3,332,464 A * | 7/1967 | Castel | ............ | F16B 39/24 411/147 |
| 3,425,119 A * | 2/1969 | Holtfreter | ............ | H01H 50/34 200/249 |
| 3,458,132 A * | 7/1969 | Newton | ............ | E01B 9/306 238/349 |
| 3,587,965 A * | 6/1971 | Newton | ............ | E01B 9/306 238/283 |
| 3,688,984 A * | 9/1972 | Sonneville | ............ | E01B 9/306 238/283 |
| 4,020,734 A * | 5/1977 | Bell | ............ | F16B 31/028 411/10 |
| 4,149,446 A * | 4/1979 | Spengler | ............ | F16B 31/028 411/11 |
| 4,483,648 A | 11/1984 | Trungold | | |
| 4,907,923 A * | 3/1990 | McGrath, Jr. | ............ | E03D 11/14 4/252.1 |
| 4,973,102 A * | 11/1990 | Bien | ............ | B62D 29/048 296/187.01 |
| 5,188,441 A * | 2/1993 | Rubel | ............ | B62D 55/26 305/165 |
| 5,279,140 A | 1/1994 | Blake et al. | | |
| 5,556,233 A * | 9/1996 | Kovago | ............ | E21D 21/008 405/259.1 |
| 5,611,229 A | 3/1997 | Chadbourne et al. | | |
| 5,769,581 A | 6/1998 | Wallace et al. | | |
| 5,829,933 A | 11/1998 | Kramer | | |
| 6,204,771 B1 | 3/2001 | Ceney | | |
| 6,604,882 B2 * | 8/2003 | Gordon | ............ | F16G 11/00 24/122.6 |
| 7,666,024 B2 | 2/2010 | De France | | |

OTHER PUBLICATIONS

International Search Report dated Dec. 4, 2015 from corresponding International Application No. PCT/US2015/038137, 5 pages.

Written Opinion dated Dec. 4, 2015 from corresponding International Application No. PCT/US2015/038137, 5 pages.

\* cited by examiner

US 10,378,576 B2

TORQUE INDICATING THREADED MECHANICAL FASTENING SYSTEMS AND METHODS

CROSS REFERENCE TO RELATED APPLICATIONS

This application claims the benefit of U.S. Provisional Application Ser. No. 62/018,229 filed Jun. 27, 2014, the contents of which are incorporated by reference herein.

BACKGROUND OF THE INVENTION

1. Field of the Invention

The present disclosure is related to threaded mechanical fastening systems and methods. More particularly, the present disclosure is related to threaded mechanical fastening systems and methods that provide an indication of torque during assembly of the system. In some embodiments, the threaded mechanical fastening systems and methods are calibrated so that the indication is a sign of over torque, while in other embodiments the indication is a sign of a desired torque level.

2. Description of Related Art

Threaded mechanical fastening systems have been used to connect various components to one another for many years. The over tightening of the threaded mechanical fastening system can potentially damage one or more portions of the fastening system and/or one or more of the components that the fastening system is being used to connect.

In some instances and in order to prevent damage, a special device that measures and/or limits the torque applied during the assembly of the components and threaded mechanical fastening system. For example, some prior art assembly operations require the use of a torque measuring device—such as but not limited to a torque wrench. Other prior art assembly operations require the use of a torque limiting device—such as, but not limited to, a torque clutch.

Unfortunately, it has been determined by the present disclosure that the use of such special tools often adds complexity and/or cost to the assembly.

Accordingly, there is a need for threaded mechanical fastening systems and methods that overcome, alleviate, and/or mitigate one or more of the aforementioned and other deleterious effects of prior art systems.

SUMMARY

Threaded mechanical fastening systems and methods are provided that allow the simple deflection of a washer to indicate that a desired minimum torque has been reached or that a desired maximum torque has been exceeded.

Threaded mechanical fastening systems are provided that, in most basic form, include a threaded connection and a washer supported as a simple beam. In this position, the washer forms a structural member that is deflected by tightening the threaded connection to or above a predetermined torque.

The above-described and other features and advantages of the present disclosure will be appreciated and understood by those skilled in the art from the following detailed description and drawings.

DETAILED DESCRIPTION

Figure 1:
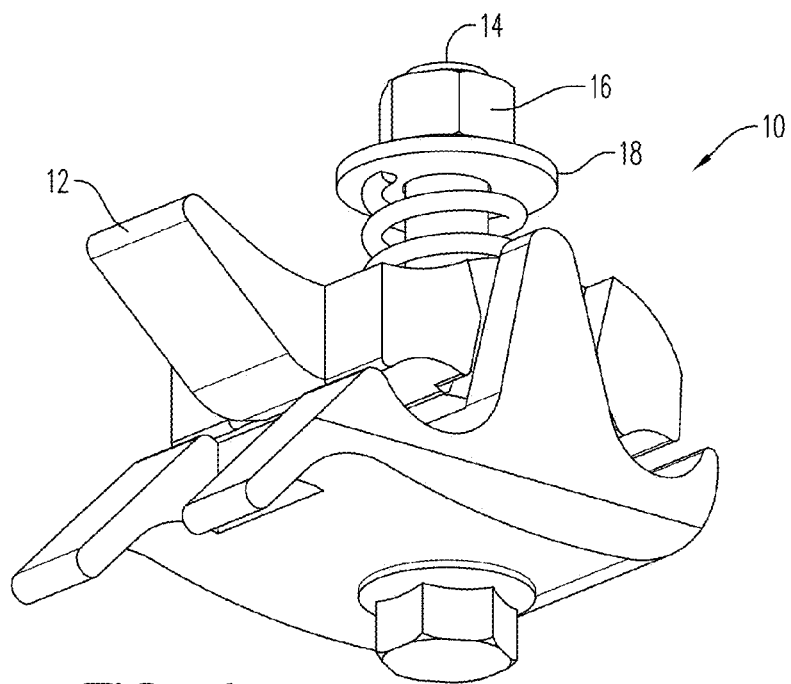
FIG. 1 is a bottom perspective view of an exemplary embodiment of a threaded mechanical fastening system according to the present disclosure.
Figure 2:
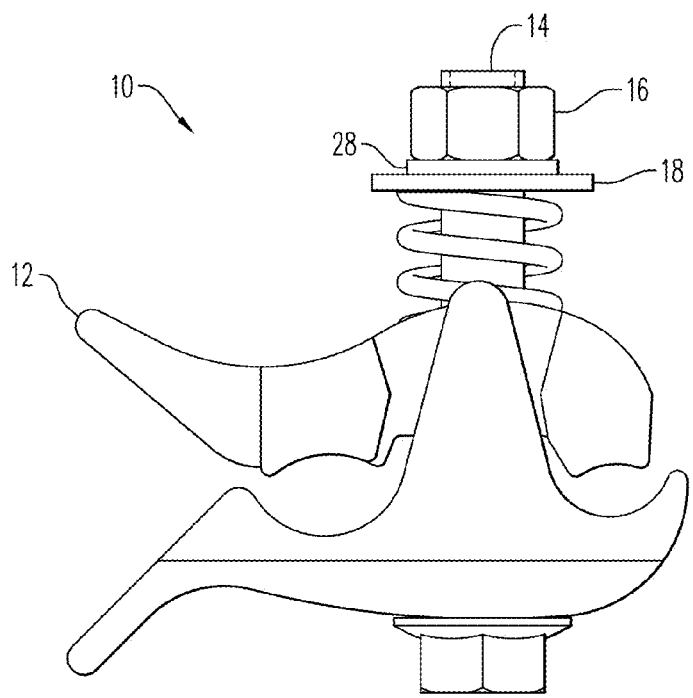
FIG. 2 is a side view of the threaded mechanical fastening system of FIG. 1.
Figure 3:
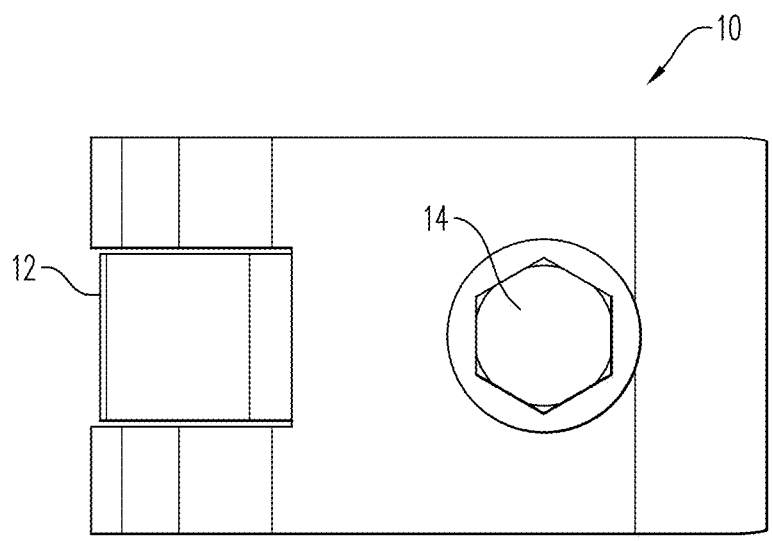
FIG. 3 is a bottom view of the threaded mechanical fastening system of FIG. 1.
Figure 4:
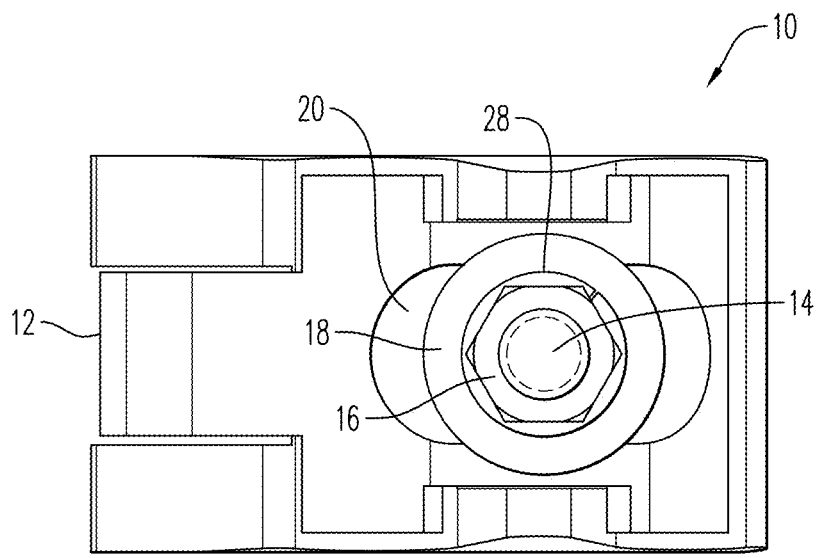
FIG. 4 is a top view of the threaded mechanical fastening system of FIG. 1.
Figure 5:
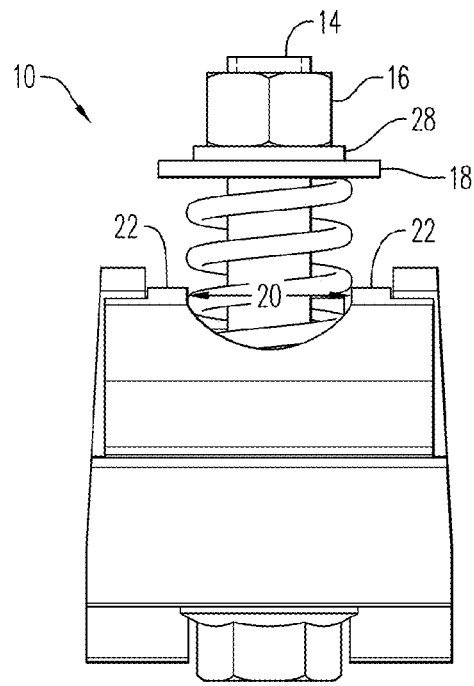
FIG. 5 is a first end view of the threaded mechanical fastening system of FIG. 1.
Figure 6:
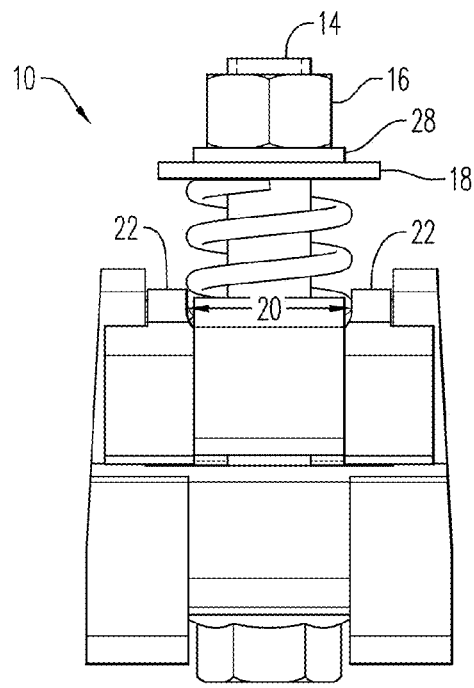
FIG. 6 is a second end view of the threaded mechanical fastening system of FIG. 1.

Referring to the drawings and in particular to FIGS. 1 through 7, an exemplary embodiment of a threaded mechanical fastening system according to the present disclosure is shown and is generally referred to by reference numeral 10.

System 10 is shown by way of example incorporated into a spring loaded parallel pad clamp such as that shown and described in U.S. Pat. No. 7,666,024, the entire contents of which are incorporated by reference herein. For reasons of brevity, only the portions of the spring loaded parallel pad clamp that are necessary for understanding of system 10 will be described herein, while the remaining portions will be omitted for reasons of brevity. Specifically, system 10 includes an upper pad 12, a threaded connection consisting of a bolt 14 and a nut 16, and a washer 18. Advantageously, system 10 includes is configured so deflection of washer 18 can be an indication over torque of the system or an indication of a desired torque level.

For example, system 10 can be calibrated so that washer 18 does not deflect at the desired system torque. Here, system 10 can be used to verify that excess torque was not applied. Stated another way, any deflection of washer 18 in this embodiment would be an indication that more than a desired amount of torque had been applied.

Alternately, system 10 can be calibrated so that washer 18 begins deflecting at a desired torque. Here, system 10 can be used as an indication that the correct torque has been applied. Stated another way, the operator can apply torque to system 10 in this embodiment until washer 18 begins to deflect, which would be an indication that a desired amount of torque had been applied.

It should be recognized that washer 18 is illustrated herein by way of example only as a flat washer. Of course, it is contemplated by the present disclosure for washer 18 to have any configuration such, as but not limited, to a Bellville washer, split washers, fender washers, internal tooth lock washers, external tooth lock washers, finishing washers, and others.

Figure 7:
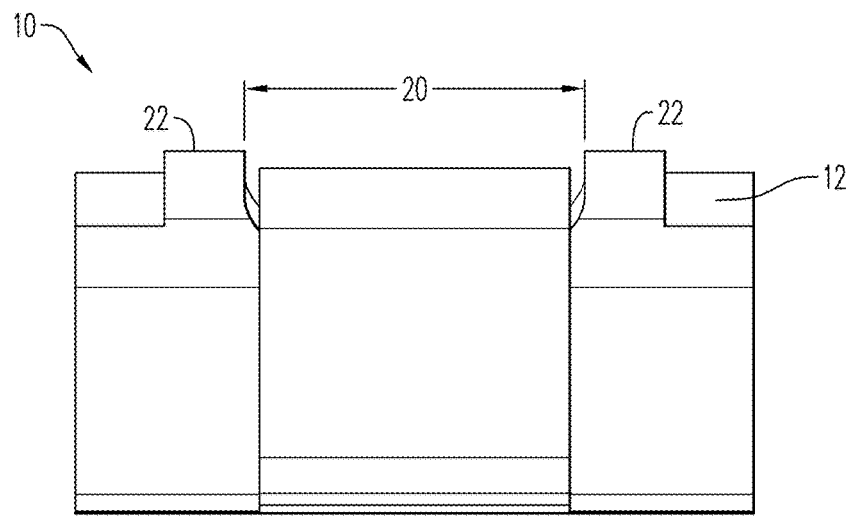
FIG. 7 is a first end view of an upper pad of the threaded mechanical fastening system of FIG. 1.

Referring now to FIG. 7, an end view of upper pad 12 is shown. The deflection of washer 18 is made possible by providing a gap 20 in upper pad 12. In this manner, the edges of gap 20 act as landings 22 that support washer 18 as a "simple beam", namely where the washer is supported at two outer extents.

Accordingly, system 10, in its most basic form, a threaded connection and a washer supported as a simple beam. In this position, washer 18 forms a structural member of the connection.

Referring now to FIGS. 8 through 11, system 10 is shown in use at different levels of torque. As is shown, the torque applied to the threaded connection (i.e., bolt and nut 14, 16) causes the threaded member to apply a linear force 24 onto washer 18. The liner force 24 in combination with the simple beam support of washer 18 result in deflection of the washer when the linear force reaches a predetermined level.

System 10 can be calibrated by adjusting one or more parameters so that the same level of torque results in different levels of deflection of washer 18.

Various properties of washer 18 that can be used to calibrate system 10 include, but are not limited to, a material, a thickness, internal washer diameter (ID), outer washer diameter (OD), heat treatment, and others.

Gap 20 can also be adjusted to calibrate system 10, where a larger gap can result in increased deflection at a certain torque, while a smaller gap can result in decreased deflection at that same torque. It should be noted that there is a lower limit below which gap 20 cannot be reduced. Specifically, linear force 24 is applied to washer 18 in a contact region 26. Thus, gap 20 must be larger than contact region 26 to ensure that washer 18 remains supported as a simple beam.

Similar to gap 20 discussed above, contact region 26 can be adjusted to calibrate system 10, where a smaller contact region can result in increased deflection at a certain torque, while a larger contact region can result in decreased deflection at that same torque. In the illustrated embodiment, contact region 26 is shown being applied by a second washer 28 that is disposed between nut 16 and washer 18. Here, second washer 28 is shown as a lock washer that has a smaller contact region than that of nut 16. Of course, it is contemplated by the present disclosure for second washer 28 to have a contact region that is the same as nut 16 or is larger contact region than that of nut 16—again provided that gap 20 is be larger than contact region 26 to ensure that washer 18 remains supported as a simple beam.

Without wishing to be bound by any particular theory, it is believed that, given the common deflection characteristics of washer 18 when configured as a simple supported beam disclosed herein that it is desired for the washer to extend far enough from the bolt to allow deflection at the designed torque/clamping force. Thus in some embodiments, gap 20 has a width that is approximately 60% larger than a diameter of the shaft of bolt 14 and the outer diameter (OD) of the washer 18 is approximately 60% larger than the width of gap 20. Of course, it is contemplated by the present disclosure for washer 18 to have any desired width and or diameter necessary to calibrate the system to the desired torque and use.

System 10 is shown in FIGS. 8 through 11 having different torque levels applied to illustrate the resulting deflection of washer 18.

Figure 8:
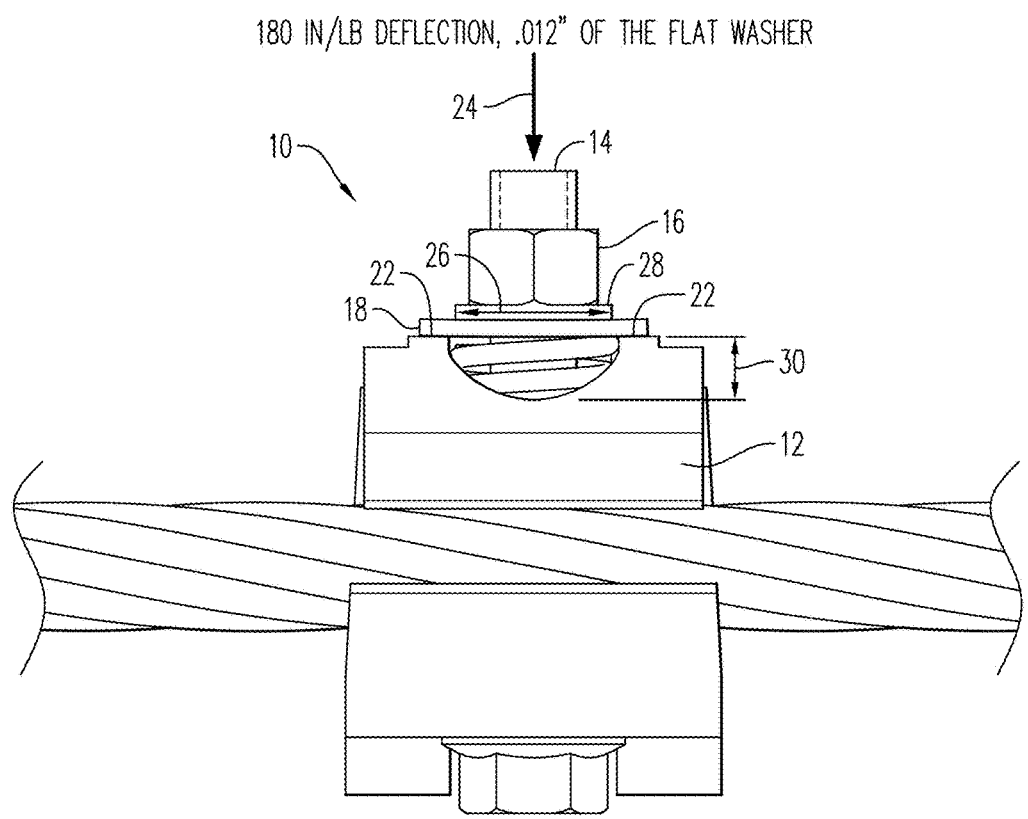
FIG. 8 is a second end view of the threaded mechanical fastening system of FIG. 1 in use at a first torque.

In FIG. 8, system 10 is shown after application of a torque of 180 inch-pounds, which is sufficient to deflect washer 18. The deflection results in a distance 30 between a point on upper pad 12 and a bottom of washer 18 being decreased by about 0.012 inches.

Figure 9:
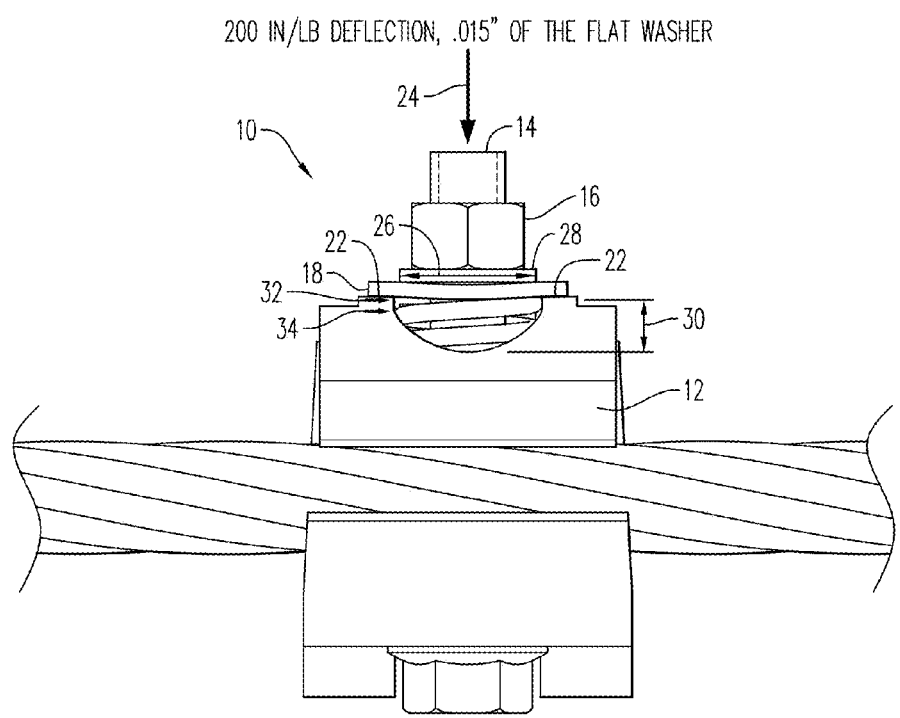
FIG. 9 is a second end view of the threaded mechanical fastening system of FIG. 1 in use at a second torque.
Figure 10:
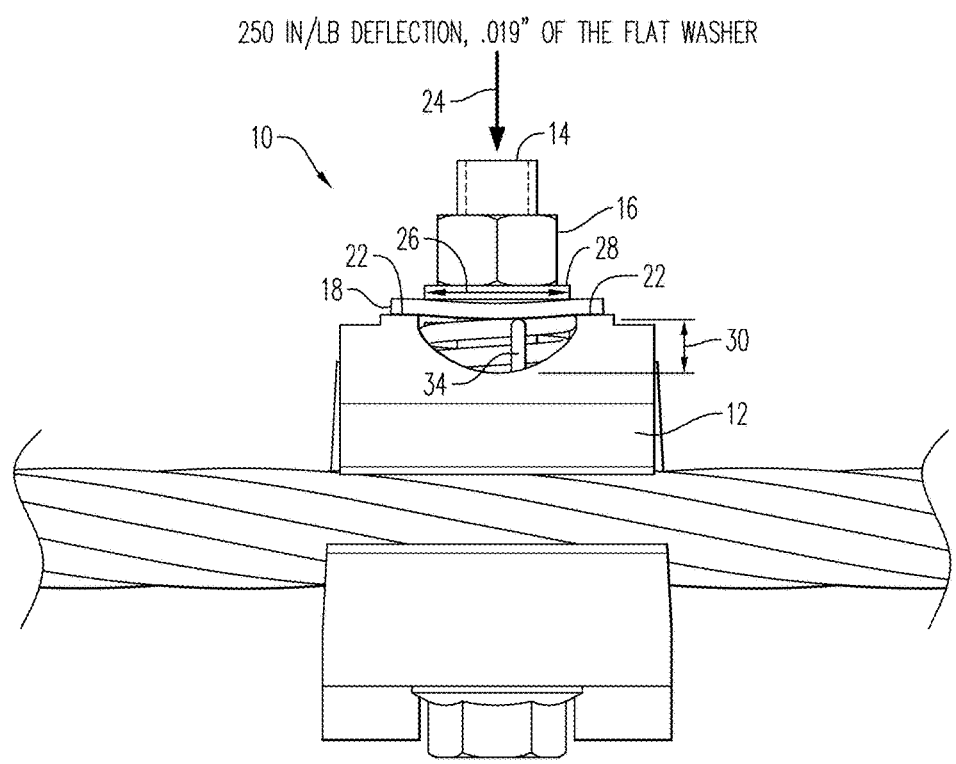
FIG. 10 is a second end view of the threaded mechanical fastening system of FIG. 1 in use at a third torque.
Figure 11:
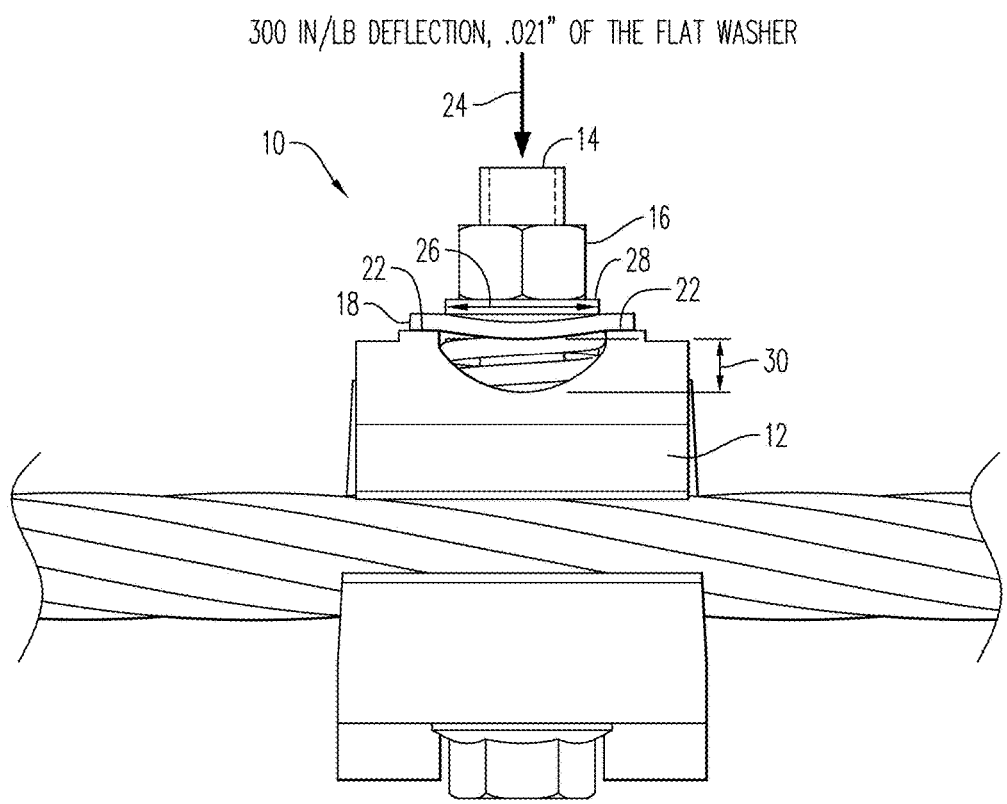
FIG. 11 is a first end view of the threaded mechanical fastening system of FIG. 1 in use at a fourth torque.

In FIG. 9, system 10 is shown after application of a torque of 200 inch-pounds, which is sufficient to result in distance 30 being decreased by about 0.015 inches. In FIG. 10, system 10 is shown after application of a torque of 250 inch-pounds, which is sufficient to result in distance 30 being decreased by about 0.019 inches. In FIG. 11, system 10 is shown after application of a torque of 300 inch-pounds, which is sufficient to result in distance 30 being decreased by about 0.021 inches.

Accordingly, system 10 can be calibrated during design to provide a desired deflection at a given torque. In some embodiments, system 10 can be calibrated so that washer 18 does not deflect at the desired system torque so that the system can be used to verify whether excess torque was applied. Alternately, system 10 can be calibrated so that washer 18 begins deflecting at a desired torque so that the system 10 can be used to determine when to stop tightening the threaded connection.

In some embodiments, system 10 can include one or more indicators, which allow the user to be able to visually verify the amount of deflection. For example, system 10 can include minimum and maximum deflection marks 32, 34 on pad 12 as shown in FIG. 9. Here, the user can ensure that washer 18 is deflected between the desired marks 32, 34. In another example, system 10 can include only a maximum deflection mark 32 or only a minimum deflection mark 34.

In yet another example shown in FIG. 10, system 10 can include a protrusion 36 on pad 12 extending towards washer 18. In use, system 10 can be tightened and as long as washer 18 does not contact the protrusion 36, the user can be assured that the system has not exceeded the maximum torque.

It should be recognized that the threaded connection is shown in the example provided above as bolt 14 and nut 16. However, it should be recognized that the present disclosure finds equal use with any threaded connection such as, but not limited to, screws including wood screws, machine screws, thread cutting screws, sheet metal screws, self-drilling screws, socket screws, and others, bolts including hex bolts, lag bolts, carriage bolts, eye bolts, U bolts, shoulder bolts, and others.

Moreover, system 10 is shown in the example provided above incorporated into a spring loaded parallel pad clamp such that the simple beam support of the washer is formed by gap 20. It should be recognized that the present disclosure finds equal use anywhere that a threaded connection is used.

In the example where system 10 is incorporated into a spring loaded parallel pad clamp many of such pads are made from a cast process (e.g., sand cast, die cast, shell mold casting, investment cast, and others). The castings can crack when system 10 is tightened beyond the recommended torque. Accordingly, system 10 can be used to ensure that excess torque is not applied—by giving a visual indication through the aforementioned deflection of washer 18. Again, the deflection of washer 18 can indicate that too much torque was applied such that a new spring loaded parallel pad clamp should be applied. Alternately, the beginning of deflection of washer 18 can indicate that the correct torque has been applied such that further torque is not necessary.

Figure 12:
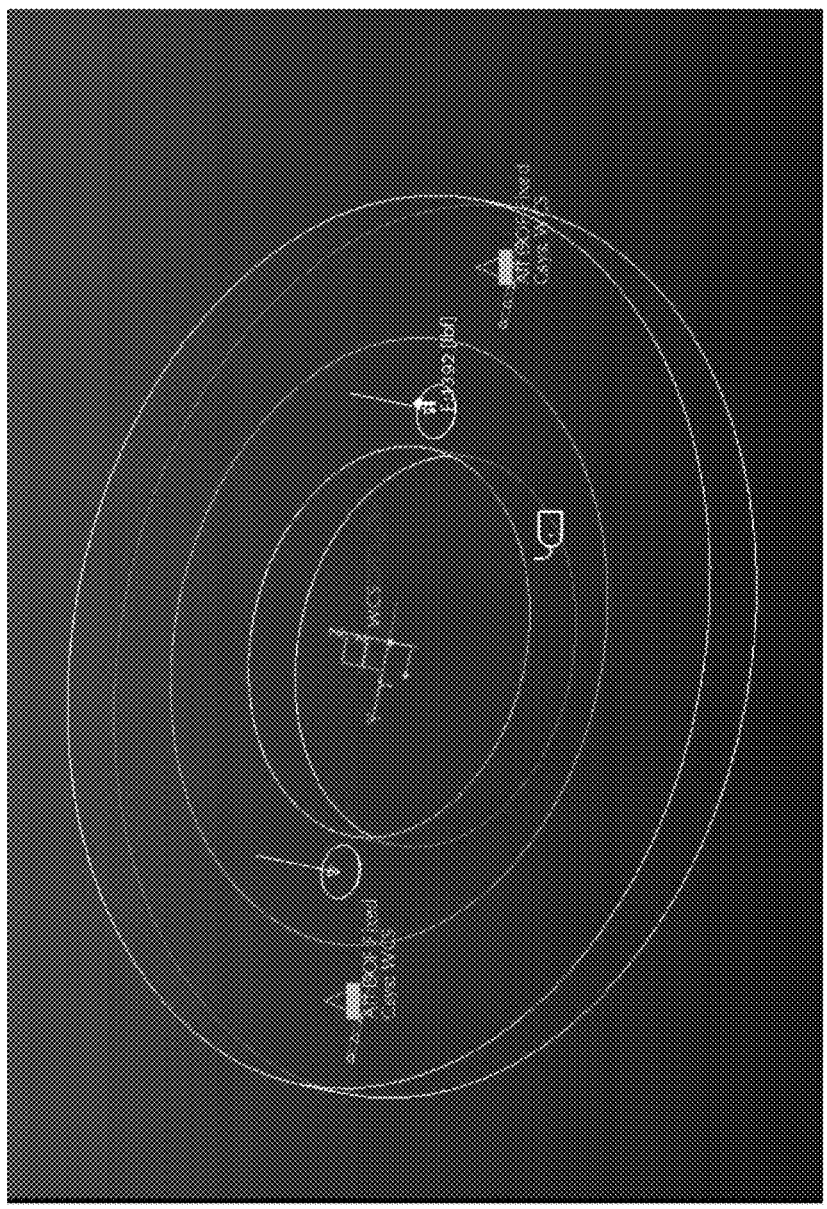
FIG. 12 illustrates an exemplary embodiment of boundary conditions on the washer of FIG. 1 during loading for use in a finite element analysis (FEA)
Figure 19:
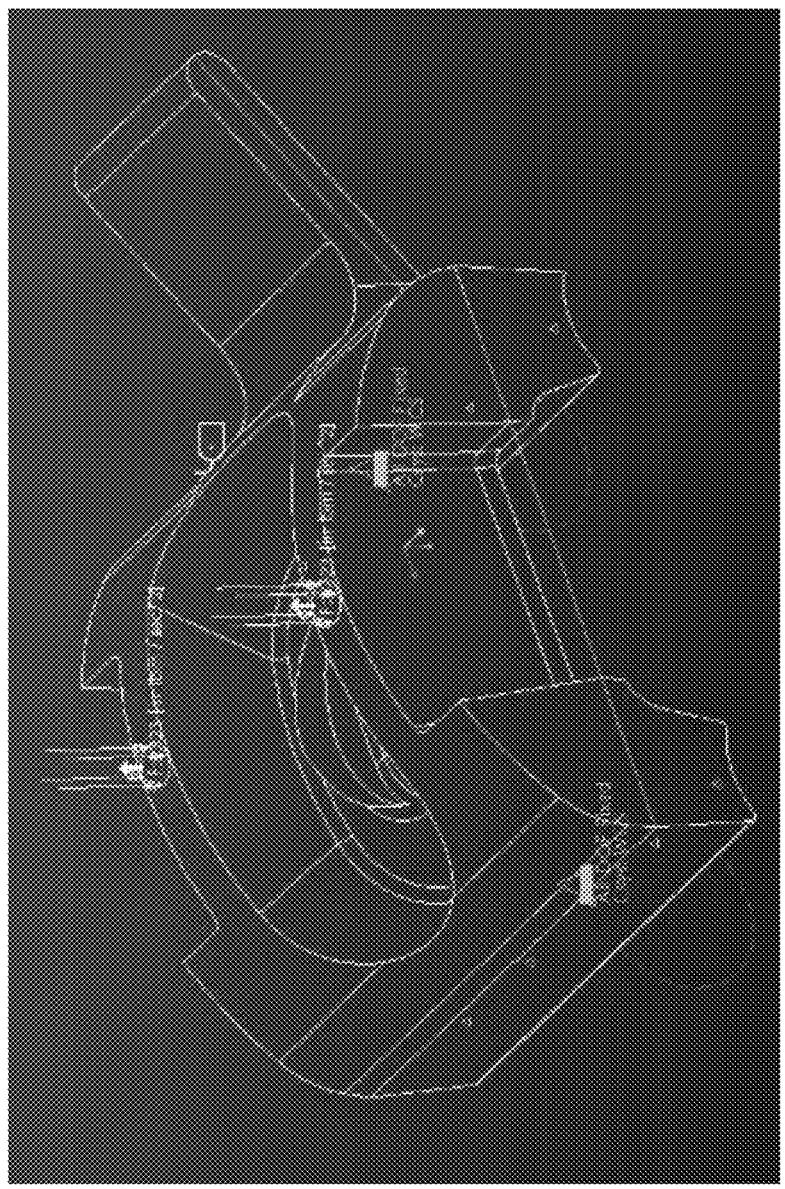
FIG. 19 illustrates an exemplary embodiment of boundary conditions on the upper pad of FIG. 1 during loading for use in FEA.

Referring now to FIGS. 12 through 23, an exemplary embodiment of a Finite Element Analysis (FEA) of system 10 is shown. FIG. 12 illustrates an exemplary embodiment of boundary conditions on washer 18 during loading, while FIG. 19 illustrates an exemplary embodiment of boundary conditions on upper pad 12 of FIG. 1 during loading.

Figure 14:
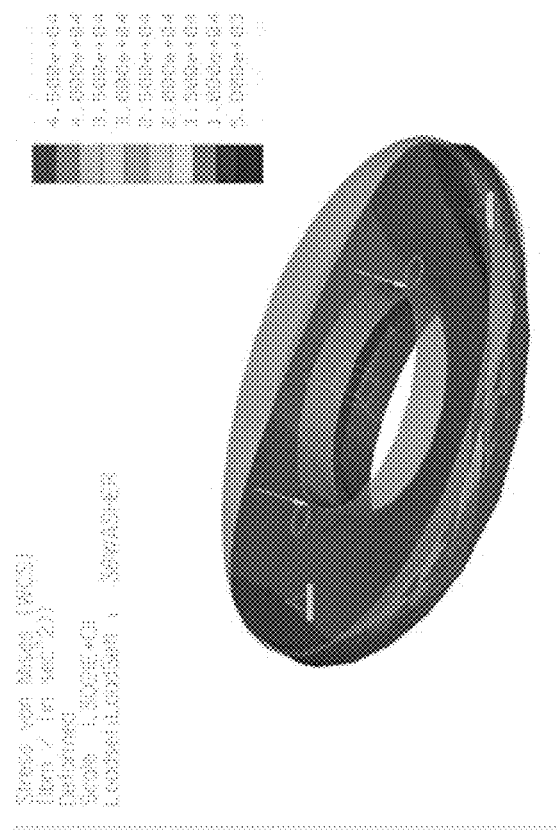
FIG. 14 illustrates an FEA stress plot of the washer at the second torque as shown in FIG. 9.
Figure 13:
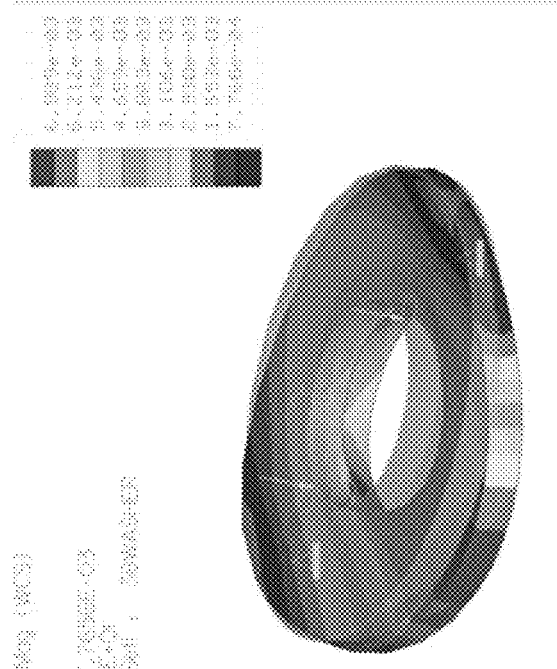
FIG. 13 illustrates an FEA resultant displacement plot of the washer at the second torque as shown in FIG. 9.
Figures 15, 16:
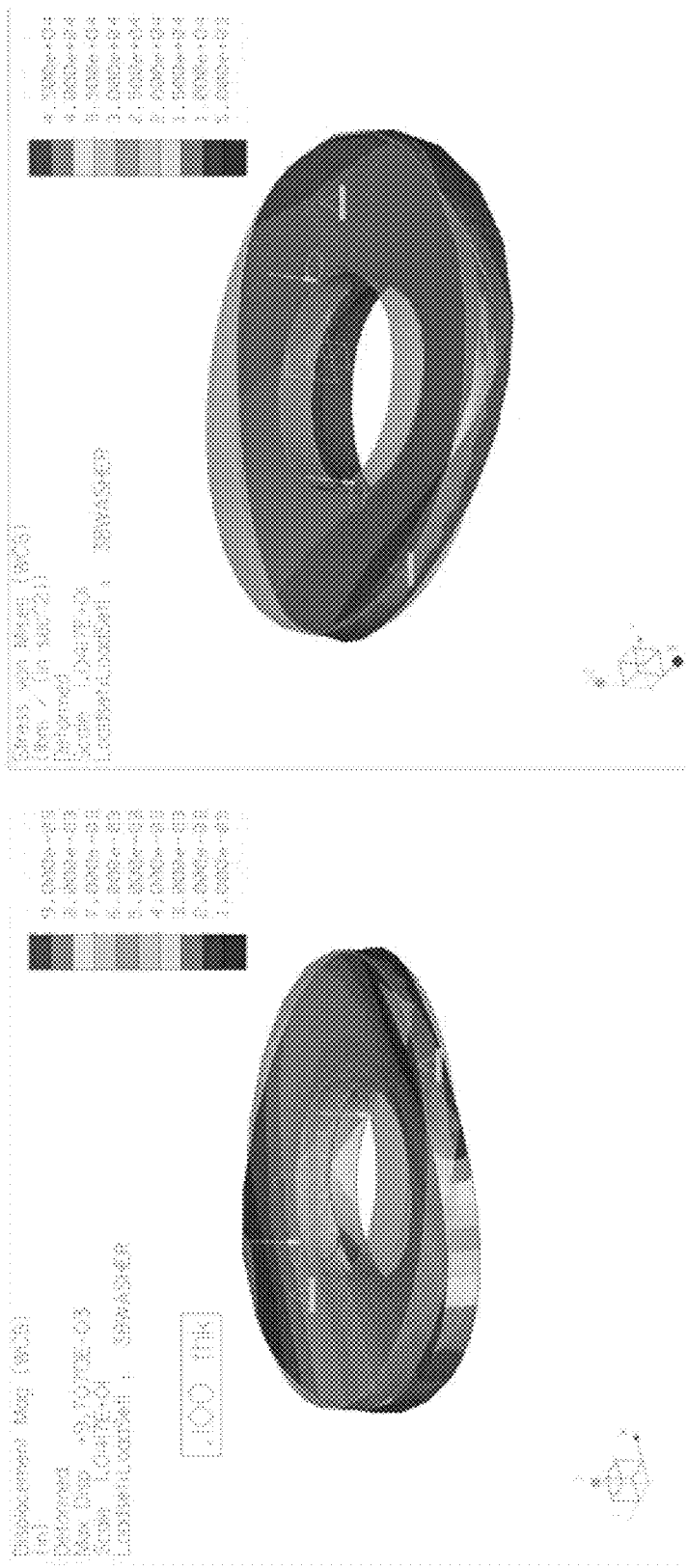
FIG. 15 illustrates an FEA resultant displacement plot of the washer at the third torque as shown in FIG. 10.
FIG. 16 illustrates an FEA stress plot of the washer at the third torque as shown in FIG. 10.
Figures 17, 18:
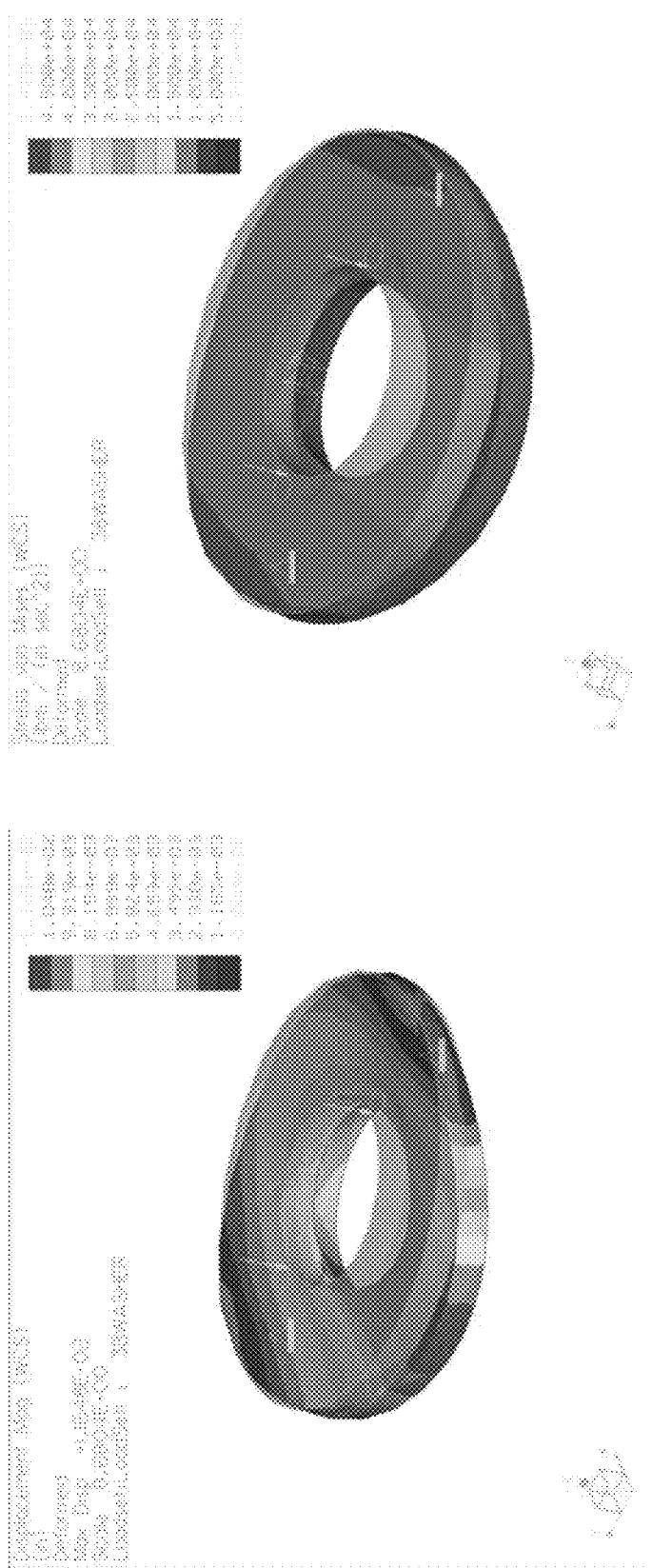
FIG. 17 illustrates an FEA resultant displacement plot of the washer at the fourth torque as shown in FIG. 11.
FIG. 18 illustrates an FEA stress plot of the washer at the fourth torque as shown in FIG. 11.

The resultant deflection and stress on washer 18 at the boundary conditions of FIG. 12 are illustrated in FIGS. 13 and 14 at 200 inch-pounds of torque, in FIGS. 15 and 16 at 250 inch-pounds of torque, and in FIGS. 17 and 18 at 300 inch-pounds of torque.

Figure 20:
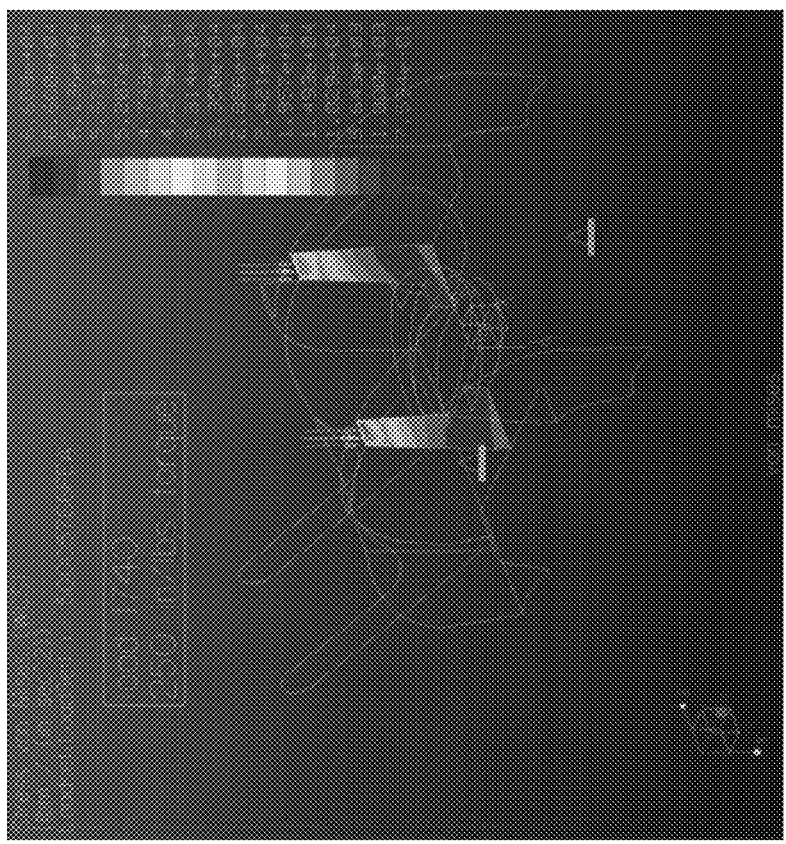
FIG. 20 illustrates an FEA section view stress plot of the upper pad at the third torque as shown in FIG. 10.
Figure 21:
FIG. 21 illustrates an FEA stress plot of the upper pad at the third torque as shown in FIG. 10.
Figure 23:
FIG. 23 illustrates an FEA stress plot of the upper pad at 535 inch-pounds of torque.
Figure 22:
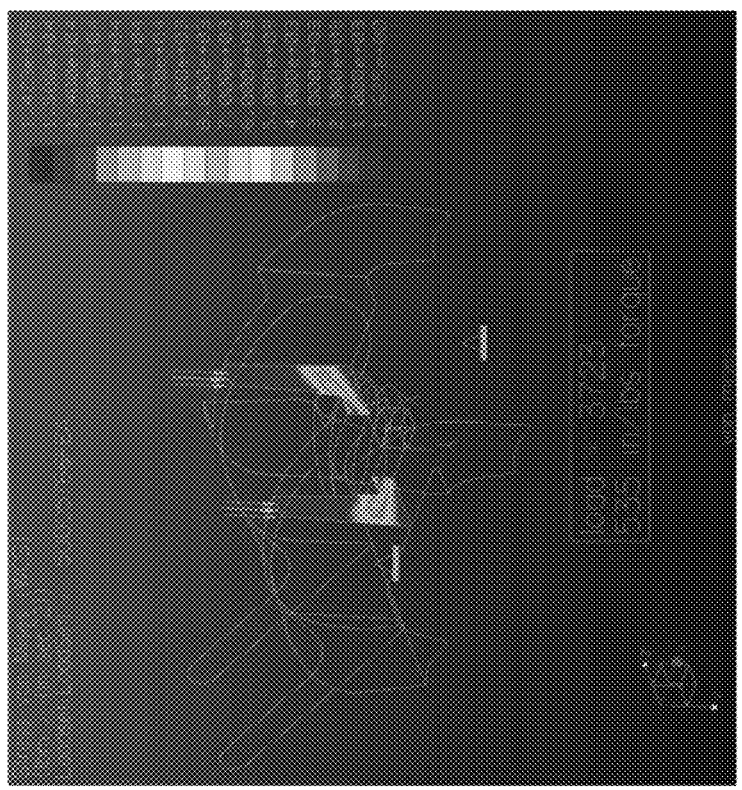
FIG. 22 illustrates an FEA section view stress plot of the upper pad at 535 inch-pounds of torque.

Additionally, the resultant stress and pressure on upper pad 12 at the boundary conditions of FIG. 19 are illustrated in FIGS. 20 and 21 at 250 inch-pounds of torque and in FIGS. 22 and 23 at 535 inch-pounds of torque.

Figure 24:
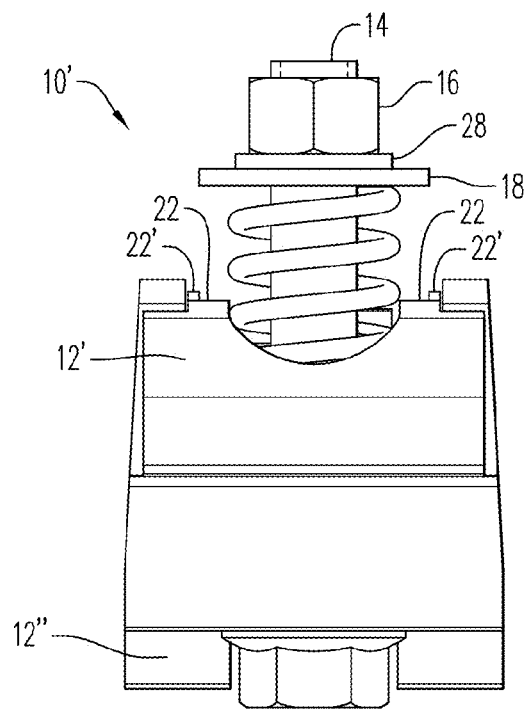
FIG. 24 is a first end view of an alternate exemplary embodiment of a threaded mechanical fastening system according to the present disclosure.
Figure 25:
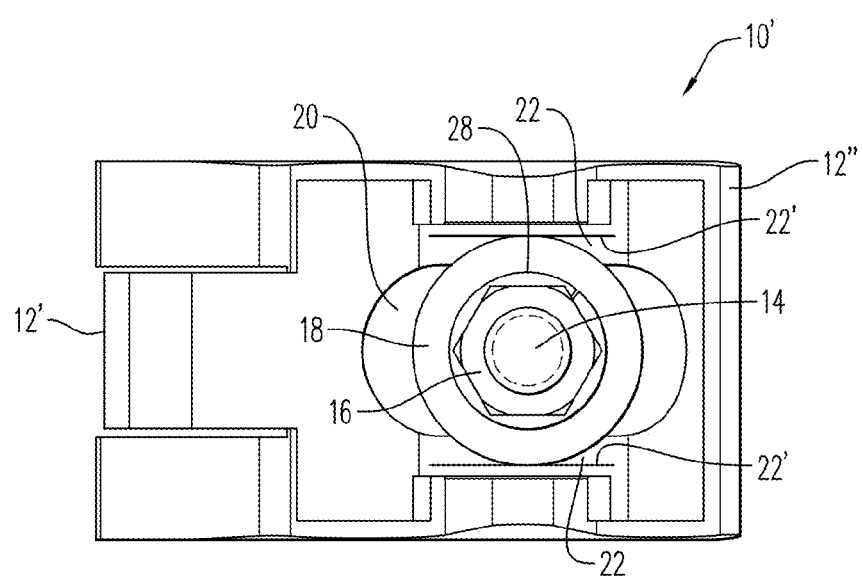
FIG. 25 is a top view of the threaded mechanical fastening system of FIG. 24.
Figure 26:
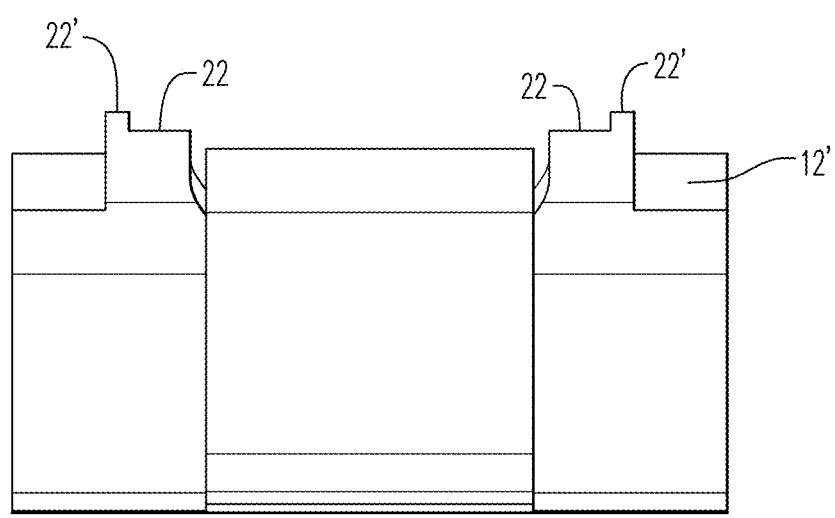
FIG. 26 is a first end view of an upper pad of the threaded mechanical fastening system of FIG. 24.

Referring now to FIGS. 24 through 26, an alternate exemplary embodiment of a threaded mechanical fastening system according to the present disclosure is shown and is generally referred to by reference numeral 10'. Description of components parts performing similar or analogous functions to those described with respect to the embodiment of FIG. 1 are omitted for reasons of brevity.

In this embodiment, upper pad 12' is configured so that landings 22 further include a washer guide edge 22'. It has been determined that centering of washer 18 with respect to gap 20 can be desired in some embodiments. Accordingly, edge 22' is positioned on both sides of gap 20 and assists in ensuring that washer 18 remains centered over the gap. In some embodiments, edge 22' can include a chamfer to ensure that washer 18 seats on landings 22 in a centered manner.

Of course, it should be recognized that the centering of washer 18 over gap 20 is described above by way of example only as edge 22' acting on the washer. However, it is also contemplated by the present disclosure for system 10' to include one or more features (e.g., edge 22') that act on one or more of washer 18, bolt 14, nut 16, and any combinations thereof so as to ensure that washer remains centered with respect to gap 20. The centering feature can be incorporated into upper pad 12' and/or into the lower pad 12" and/or can be a separate centering component.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A spring loaded pad clamp, comprising:
a deflection washer having an outer dimension;
a threaded connection including a bolt and a nut;
an upper pad having a gap having edges that support the outer dimension of the deflection washer, the threaded connection having a portion that passes through the deflection washer and the gap, the threaded connection having a contact region that contacts the deflection washer, the gap being larger than the contact region so that the threaded connection, when tightened to a predetermined torque, deflects, in bending, the deflection washer into the gap without deflecting, in bending, the upper pad,
wherein the deflection washer, the threaded connection, the washer, and the gap are configured so that deflection of the deflection washer is a visual indicator, when viewed from a side of the deflection washer, that the threaded connection has been tightened above the predetermined torque.

2. The clamp of claim 1, wherein the predetermined torque is dependent upon at least one property of the deflection washer selected from the group consisting of a material, a thickness, an internal washer diameter, the outer dimension of the deflection washer, and a heat treatment.

3. The clamp of claim 2, wherein the predetermined torque is dependent upon a width of the gap.

4. The clamp of claim 1, wherein the contact region comprises a region of contact between the deflection washer and either a head of the bolt or the nut.

5. The clamp of claim 1, further comprising a second washer positioned between the deflection washer and either a head of the bolt or the nut.

6. The clamp of claim 1, wherein the edges of the gap further comprise a washer guide edge sufficient to center the deflection washer with respect to the gap.

7. The clamp of claim 1, further comprising a deflection indicator positioned to allow a user to visually verify an amount of deflection of the deflection washer as the visual indicator.

8. The clamp of claim 7, wherein the deflection indicator is selected from the group consisting of a minimum deflection mark, maximum deflection mark, and a protrusion.

9. A spring loaded pad clamp, comprising:
a deflection washer having an outer dimension;
a threaded connection including a bolt and a nut;
an upper pad having a gap having edges that support the outer dimension of the deflection washer, the threaded connection having a portion that passes through the deflection washer and the gap, the threaded connection having a contact region that contacts the deflection washer, the gap being larger than the contact region so that the threaded connection, when tightened to a predetermined torque, deflects, in bending, the deflection washer into the gap, wherein the gap has a width that is 60% larger than a diameter of a shaft of the bolt and the outer dimension of the deflection washer is 60% larger than the width of gap.

10. The clamp of claim 9, wherein the predetermined torque is a minimum torque such that the bending is an indication that the minimum torque has been reached.

11. The clamp of claim 9, wherein the predetermined torque is a maximum torque such that the bending is an indication that the maximum torque has been exceeded.

12. The clamp of claim 9, wherein the predetermined torque is dependent upon at least one property of the deflection washer selected from the group consisting of a material, a thickness, an internal washer diameter, the outer diameter of the washer, and a heat treatment.

13. The clamp of claim 9, wherein the deflection washer, the threaded connection, and the gap are configured so that deflection of the deflection washer is a visual indicator, when viewed from a side of the deflection washer, that the threaded connection has been tightened to or above the predetermined torque.

14. The clamp of claim 13, wherein the predetermined torque is a minimum torque such that the bending is an indication that the minimum torque has been reached.

15. The clamp of claim 13, wherein the predetermined torque is a maximum torque such that the bending is an indication that the maximum torque has been exceeded.

16. The clamp of claim 13, wherein the visual indicator further comprises a minimum deflection mark or a maximum deflection mark.

17. The clamp of claim 9, wherein the contact region comprises a region of contact between the deflection washer and either a head of the bolt or the nut.

18. The clamp of claim 9, wherein the edges of the gap further comprise a washer guide edge sufficient to center the deflection washer with respect to the gap.

* * * * *